Figure 1:
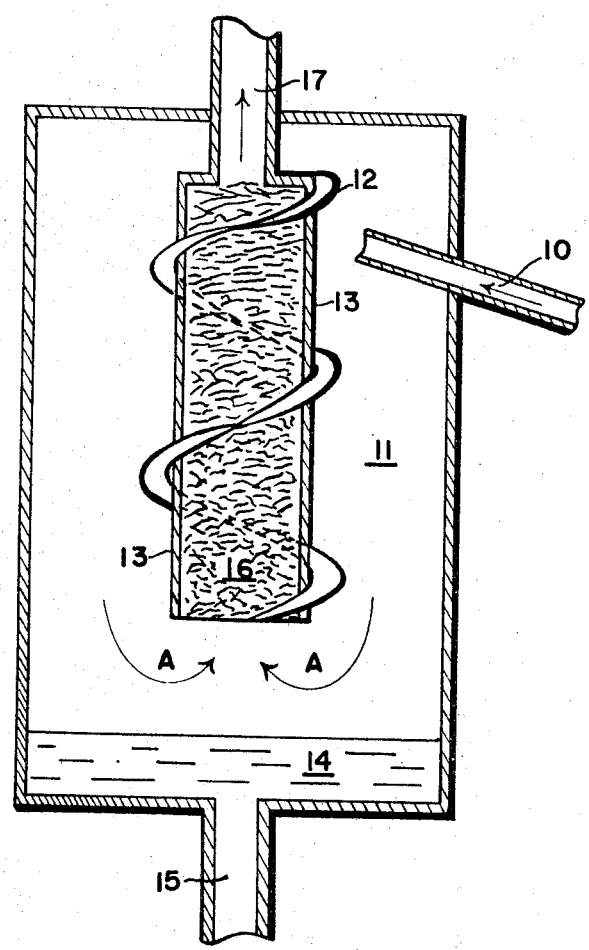

Sept. 5, 1967  R. W. SIMS  3,339,350
GAS-LIQUID SEPARATOR
Filed May 28, 1965  3 Sheets-Sheet 1

INVENTOR.
ROBERT W. SIMS
BY
M. N. Shears
ATTORNEY

Sept. 5, 1967 R. W. SIMS 3,339,350
GAS-LIQUID SEPARATOR

Filed May 28, 1965 3 Sheets-Sheet 3

INVENTOR.
Robert W. Sims
BY
ATTORNEY

United States Patent Office 3,339,350
Patented Sept. 5, 1967

3,339,350
GAS-LIQUID SEPARATOR
Robert W. Sims, Pasadena, Tex., assignor to Monsanto Company, St. Louis, Mo., a corporation of Delaware
Filed May 28, 1965, Ser. No. 459,620
5 Claims. (Cl. 55—320)

The present invention relates to the separation of undesired particles from gaseous streams. More particularly, the present invention relates to a unique separator for removing undesired particles, either liquid or solid from gaseous streams.

Gases often contain significant quantities of contaminating liquids and/or solids dispersed therein which often must be removed from the gas prior to its use. These liquid and/or solid contaminants are usually present in the gas in the form of finely divided particles. While these finely divided dispersed particles are usually filterable from the gases in which they are entrained, if these contaminants are present in any quantity their removal requires a large, cumbersome arrangement of filters which usually necessitates frequent purging or regeneration of the filters. Further, because of the size and arrangement of the conventional filter means, they do not well lend themselves to use in situations where it is necessary to highly insulate or regulate the temperature of the filtering zone.

It is an object of the present invention to provide a new and novel means for separating liquids and/or solids from gases. An additional object of the present invention is to provide a small, simple, compact separator means for efficiently removing entrained liquid and/or solid particles from gaseous streams. It is also an object of the present invention to provide a separator for removing entrained particles of liquids and/or solids from gases whereby large filter means requiring frequent regeneration are substantially alleviated. Additional objects will become apparent from the following description of the invention herein disclosed.

The separator of the present invention comprises a chamber, a vertically positioned substantially cylindrical tube located within said chamber, said substantially cylindrical tube in open communication at its lower end with said chamber and in open communication at its upper end with a flow means external of said chamber, a helically arranged baffle on the external surface of said substantially cylindrical tube, a filter means within said substantially cylindrical tube, inlet means for flowing a gaseous stream containing entrained particles into contact with said helically arranged baffle near its upper end such that the flow of said gaseous stream is directed downwardly substantially along the path of said baffle, and outlet means at the bottom of said chamber for withdrawing particles separated from said gaseous stream from said chamber.

Several significant advantages are inherent in the apparatus of the present invention. This apparatus is significantly smaller, more simple and more compact than conventional apparatus for removing entrained liquid and/or solid particles from gases. These advantages are realized with no loss in efficiency. The arrangement of the apparatus of the present invention is such that it is easily insulated or surrounded by heating or cooling means. Further, it requires less attention and maintenance than similarly efficient apparatus employing filter means only. In addition, other advantages are found in the many possible applications of the apparatus of the present invention.

Figure 2:
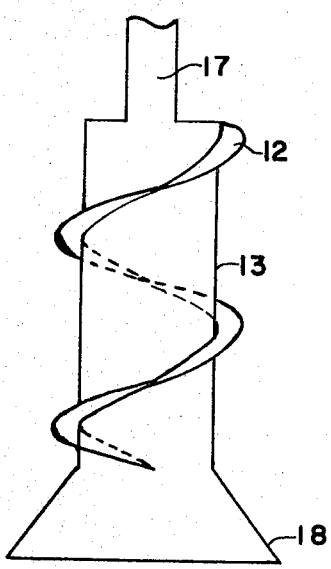
Figure 3:
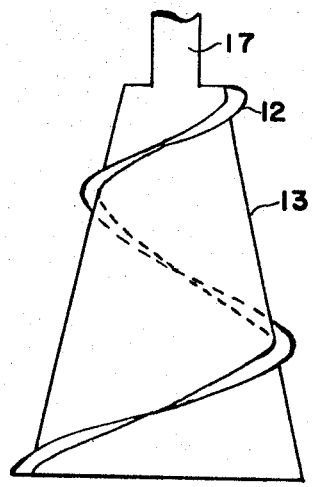
Figure 4:
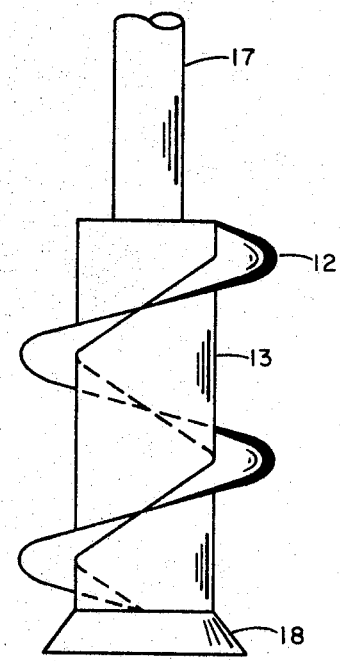

The apparatus of the present invention is further described by reference to the accompanying drawings. FIGURE 1 of the drawings is a schematic drawing of an embodiment of the apparatus of the present invention. FIGURE 2 is a schematic drawing of an embodiment of the substantially cylindrical tube feature of the apparatus of the present invention. FIGURE 3 is a schematic drawing of another embodiment of the feature of the apparatus of the present invention shown in FIGURE 2. FIGURE 4 is also a schematic drawing of another embodiment of the substantially cylindrical tube feature of the apparatus of the present invention.

In each of the drawings, the same reference characters are used throughout to denote like features of the apparatus of the present invention. To describe the present invention in relation to the drawings, reference is made to FIGURE 1, though the like features of FIGURES 2, 3, and 4 function in substantially the same manner as their counterparts in FIGURE 1.

Referring to FIGURE 1, a gaseous stream containing dispersed therein finely divided entrained particles is introduced by means of line 10 into chamber 11 and into contact with helically arranged baffle 12. Helically arranged baffle 12 is attached to the outer surface of cylindrical tube 13. The gaseous stream is contacted with helically arranged baffle 12 at an angle and with force sufficient to cause the gas flow to be deflected downwardly along the helical path of helically arranged baffle 12. As the gaseous stream passes downward along the path of helically arranged baffle 12, sufficient centrifugal force is developed to cause a large portion of the entrained particles to be separated from the gaseous stream. The separated particles then fall as a result of gravity to the bottom of chamber 11 where they usually form a particle mass or bed 14 across the bottom of chamber 11. Particle mass or bed 14 which may be liquid and/or solid depending upon the nature of the material entrained in the gaseous stream, serves as a seal to prevent flow of the gaseous stream from chamber 11 via drain line 15 which is provided for the purpose of allowing maintenance of a desired level of particle bed 14. Maintenance of particle bed 14 at the desired level is affected by continuously or intermittently draining a portion of particle mass 14 from chamber 11 by means of drain 15.

The gaseous stream, after proceeding downwardly to the lower end of cylindrical tube 13, substantially follows the path shown by arrows A by passing around and below the end of cylindrical tube 13 and passing into and upwardly through cylindrical tube 13. In passing upward through cylindrical tube 13, the gaseous stream flows through and across filter means 16 which removes substantially all of the entrained liquid and/or solid not removed by the centrifugal force imparted to the gaseous stream by helically arranged baffle 12. The entrained material removed by filter means 16 also falls by means of gravity to the bottom of chamber 11 to form a part of particle mass or bed 14. After passing up through cylindrical tube 13 containing filter means 16, the purified gaseous stream is conveyed away from the separator apparatus by flow means 17.

Referring to FIGURES 2 and 4, a particularly useful embodiment of a feature of the apparatus of the present invention is shown. The feature shown by FIGURES 2 and 4 is cylindrical tube 13 having attached to its external surface helically arranged baffle 12. The embodiment of this feature is the apparatus of the present invention shown in FIGURES 2 and 4 is that in which cylindrical tube 13 is flared at its lower end to a diameter greater than the diameter of cylindrical tube 13 to provide a conical shaped lower section 18 of cylindrical tube 13. In this embodiment, as shown in FIGURES 2 and 4, helically arranged baffle 12 is terminated at its lower end at approximately the point at which the walls of cylindrical tube 13 begin to flare to form conical section 18. The diameter of conical section 18 must not be such that it will put conical section 18 in sufficiently close contact with the walls of chamber 11 to interfere with circulation of the gaseous stream over and around the external surfaces of tube 13 or the fallout and drain of the particles separated from the gaseous stream by centrifugal force. Preferably, this diameter is no greater than that of a horizontal circle described by the outer edges of helically arranged baffle 12 as is shown in FIG. 4.

With respect to FIGURE 3, another embodiment of the feature of the apparatus of the present invention illustrated in FIGURE 2 is shown. In the embodiment shown in FIGURE 3, substantially cylindrical tube 13 is shown as slightly conical in configuration. As with the embodiment of FIGURE 2, the maximum diameter of substantially cylindrical tube 13 should not be such as would interfere with the free circulation of the gaseous stream around the outer surface of cylindrical tube 13 or such as to interfere with the fallout and drain of the material removed from the gaseous stream by centrifugal force.

The apparatus of the present invention is particularly well illustrated by its use in the removal of entrained cupric chloride catalyst particles from the off-gas stream from the cupric chloride catalyst reaction of acetylene and hydrogen cyanide to produce acrylonitrile. This off-gas stream is primarily comprised of a mixture of unreacted acetylene, nitrogen, methane and acrylonitrile and often contains as much as 2–3% by weight of entrained cupric chloride. The apparatus used in this application substantially conforms to that illustrated in FIGURE 1 with the exception that the substantially cylindrical tube feature of FIGURE 2 was used therein. The entrained cupric chloride was reduced to a negligible amount by passing the cupric chloride-containing off-gas through the separator apparatus of the present invention.

As is noted from the above discussion of the accompanying drawings, the substantially cylindrical tube of the apparatus of the present invention is not limited to a tube formed by true cylindrical surfaces. In using the term "cylindrical" in the present specification, it is used in the sense that a cylinder or cylindrical surface is but a segment of a cone having its apex at infinity. The terms "cone" or "conical" as used herein, refer to true cones having an apex at less than infinity. The substantially cylindrical tubes of the apparatus of the present invention include not only those which meet the above definition of cylindrical, but also includes those tubes which though not cylindrical, being slightly conical as shown in FIGURE 3, are substantially cylindrical. Also included within the substantially cylindrical tubes of the apparatus of the present invention are those having a partially cylindrical surface and a partly conical surface as shown in FIGURE 2. Further, the substantially cylindrical tube of the present invention may be one comprised of two continuous segments both conical in shape and having a common axis, but with different apexes. Regardless of which of these shapes the substantially cylindrical tube takes, it is generally substantially circular in the horizontal plane. In any instance in which any segment of the substantially cylindrical tube is conical in shape, the greatest radius of this segment will seldom be greater than that extending horizontally from the axis of the tube to the outer edge of the helically arranged baffle attached to the outer surface of the cylindrical tube. The length to diameter ratio of the substantially cylindrical tube of the apparatus of the present invention will vary considerably with the particular applications for which the present invention finds utility. Seldom, however, will this ratio be less than 1:1 and is more often in excess of 1.25:1. Obviously, the more finely divided the entrained dispersed particles and the less the difference in density of the entrained particles and the gases in which they are entrained, the higher will be height to diameter ratio of the substantially cylindrical tube under a given set of circumstances as to filter means, helical baffle configuration, etc. Further, the height to diameter ratio of the substantially cylindrical tube will vary with the efficiency of the helically arranged baffle and the filter means within the tube. Optimum height to diameter ratios may in most instances be calculated, however, by those skilled in the art.

The helically arranged baffle feature of the apparatus of the present invention is attached to the outer or external surface of the substantially cylindrical tube. The purpose of the helicoidal baffle is, of course, to impart centrifugal force to the gas stream containing entrained particles. With this in mind, those skilled in the art should have little difficulty in designing the helicoidal baffle in such fashion as to obtain the desired end. Among the primary details of the baffle which must be considered are its width as related to the amount of deflecting surface presented, the angle of its deviation from the horizontal, the angle at which it intersects with the external surface of the substantially cylindrical tube, the length of the baffle, especially in relation to the length of the substantially cylindrical tube, the diameter of the circle described by the helicoidal baffle, etc. Since these details will vary considerably with the application of the present apparatus and since it is well within the ability of those skilled in the art to calculate the optimum design for a helicoidal baffle, no further discussion of its design is necessary.

In determining the size and configuration of both the substantially cylindrical tube and the helicoidal baffle attached thereto, the amount of free space remaining between the cylindrical tube and the walls of the chamber within which it is positioned must be considered. Sufficient space must remain for free circulation of the gaseous stream within the chamber and for the fallout and drain of the particles separated from the gaseous stream by the centrifugal force produced by the helicoidal baffle. The amount of free space for optimum performance will, of course, vary with the velocity and quantity of gas per volume of the chamber, the nature and quantity of the particles entrained in the gas, etc., and is readily determinable by those skilled in the art.

The shape of the chamber within which the substantially cylindrical tube is positioned is most often also substantially cylindrical. This chamber must be of length sufficient to allow space below the lower end of the cylindrical tube for collection of the separated particles without the collected particle mass interfering with the gas flow within the chamber.

The filter means within the substantially cylindrical tube may be virtually any material capable of filtering entrained particles from gaseous streams. Such materials include various metal packings such as metal turnings, grids, spheres, wires, etc., various synthetic and natural fibrous materials such as glass wool, asbestos fibres, fibrous alumino silicates, etc., and various inert non-metallic, non-fibrous packing material such as clays, molecular sieves, silica, alumina or silica-alumina pellets or particles, porous plates of various refractory materials. Particularly useful are the fibrous materials such as glass wool, fibrous alumino-silicates, etc., which are readily replaceable and which because of their nature require practically no supporting structure within the cylindrical tube besides the tube itself.

The apparatus of the present invention can be used to remove any entrained liquid and/or solid particles from gases. "Entrained" as used herein, refers to materials carried as particles, either liquid or solid in the gas and does not include materials which are absorbed in the gas. The primary criteria, of course, is that the entrained liquid or solids have a greater density or weight per unit volume than the gas under the conditions of temperature, etc., at which the apparatus is operated. In its most useful application, the present apparatus is utilized for the removal of entrained liquids from gases. The terms "gases," "gas," and "gaseous streams" as used in the present description include not only those materials which are gases under ambient conditions, but also include any material in the vapor or gaseous state. Because of the small size by comparison with other similarly effective separators, its compactness and its simplicity of design, the apparatus of the present invention is particularly useful in those applications wherein non-ambient temperatures, either above or below normal, must be maintained in the separation zone. The present apparatus may be readily surrounded with an annular free space for circulation of heating or cooling fluids or it may be readily insulated with suitable materials for preventing a temperature change in the separation zone. Among the applications for which the present invention is particularly useful is the removal of particles of water from such inert gas streams as nitrogen, helium, etc., removal of entrained particles of catalyst, either liquid or solid, from product streams, removal of dust and other similar solid particles from air or other such gases, etc.

What is claimed is:

1. An apparatus for separating entrained particles from gases which comprises a chamber, a vertically positioned tube located within said chamber, said tube in open communication at its lower end with said chamber and in open communication at its upper end with a flow means external of said chamber, said tube having a cylindrical upper section, said cylindrical upper section being flared at its lower end to a diameter greater than the diameter of said cylindrical upper section so as to provide a conical shaped lower section, a helically arranged baffle on the external surface of said tube, said helically arranged baffle being terminated at its lower end at approximately the point at which the walls of said cylindrical upper section begins to flare to form said conical shaped lower section, a filter means within said tube, inlet means for flowing a gaseous stream containing entrained particles into contact with said helically arranged baffle near its upper end such that the flow of said gaseous stream is directed downwardly substantially along the path of said baffle, and outlet means at the bottom of said chamber for withdrawing particles separated from said gaseous stream from said chamber.

2. The apparatus of claim 1 wherein the diameter of the lower end of said conical shaped lower section is no greater than that of a horizontal circle described by the outer edges of said helically arranged baffle.

3. The apparatus of claim 1 wherein said tube has a length to diameter ratio of greater than 1:1.

4. The apparatus of claim 1 wherein said tube has a length to diameter ratio of greater than 1.25:1.

5. The apparatus of claim 1 wherein said filter means is one selected from the group consisting of glass wool, asbestos fibres and fibrous alumino silicates.

References Cited

UNITED STATES PATENTS

| | | | |
|---|---|---|---|
| 1,393,066 | 10/1921 | Atkinson | 55—457 |
| 1,669,417 | 5/1928 | Le Grand | 55—319 |
| 2,015,464 | 9/1935 | Saint-Jacques | 55—457 |
| 3,046,717 | 7/1962 | Northrup et al. | 55—320 |
| 3,161,490 | 12/1964 | Dudek | 55—320 |
| 3,176,501 | 4/1965 | Briggs | 55—329 |
| 3,200,568 | 8/1965 | McNeil | 55—191 |
| 3,212,232 | 10/1965 | McMinn | 55—191 |
| 3,212,240 | 10/1965 | Streete | 55—346 |

HARRY B. THORNTON, *Primary Examiner.*

B. NOZICK, *Assistant Examiner.*